United States Patent
Nishikawa et al.

(10) Patent No.: US 11,892,304 B2
(45) Date of Patent: Feb. 6, 2024

(54) VEHICLE GUIDANCE METHOD AND VEHICLE GUIDANCE DEVICE

(71) Applicant: Panasonic Intellectual Property Management Co., Ltd., Osaka (JP)

(72) Inventors: Masakiyo Nishikawa, Nara (JP); Tomohiro Konuma, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 112 days.

(21) Appl. No.: 17/544,386

(22) Filed: Dec. 7, 2021

(65) Prior Publication Data

US 2022/0196411 A1   Jun. 23, 2022

(30) Foreign Application Priority Data

Dec. 17, 2020   (JP) ................................ 2020-208958

(51) Int. Cl.
  *G01C 21/34*   (2006.01)
  *B60W 30/06*   (2006.01)
  *G01C 21/36*   (2006.01)

(52) U.S. Cl.
  CPC ......... *G01C 21/3415* (2013.01); *B60W 30/06* (2013.01); *G01C 21/3685* (2013.01)

(58) Field of Classification Search
  CPC ........... G01C 21/3415; G01C 21/3685; B60W 30/06; B62D 15/0285
  See application file for complete search history.

(56) References Cited

U.S. PATENT DOCUMENTS

| | | | | |
|---|---|---|---|---|
| 2017/0308095 | A1* | 10/2017 | Irion | G05D 1/0282 |
| 2017/0313306 | A1* | 11/2017 | Nordbruch | G05D 1/0011 |
| 2020/0019160 | A1* | 1/2020 | McArthur | G01S 17/87 |
| 2020/0130676 | A1* | 4/2020 | Smid | G05D 1/0231 |
| 2021/0215490 | A1* | 7/2021 | Mishra | G01C 21/3415 |
| 2021/0262823 | A1* | 8/2021 | Abdelaziz | G01C 21/3492 |
| 2022/0092979 | A1* | 3/2022 | Gambella | G01C 21/3685 |

FOREIGN PATENT DOCUMENTS

| | | |
|---|---|---|
| JP | 2018-502357 | 1/2018 |
| WO | 2016/066362 | 5/2016 |

* cited by examiner

*Primary Examiner* — Anne Marie Antonucci
*Assistant Examiner* — Patrick Daniel Mohl
(74) *Attorney, Agent, or Firm* — Greenblum & Bernstein, P.L.C.

(57) ABSTRACT

A controller determines a travel route from a starting position to a target position in a parking lot and transmits information on at least a section in the travel route to a vehicle, and a monitor monitors the vehicle for a deviation from the travel route during autonomous travel of the vehicle in the section by using a vehicle monitoring system outside the vehicle. When a deviation is detected in the monitoring, the controller determines a correction route for correcting the deviation, and transmits the correction route to the vehicle. When the controller determines that the vehicle cannot travel along the correction route, the controller determines an evacuation route with the current position of the vehicle set to the starting position and a predetermined location set to the target position, and transits the evacuation route to the vehicle such that the vehicle travels along the evacuation route.

9 Claims, 9 Drawing Sheets

VEHICLE GUIDANCE METHOD AND VEHICLE GUIDANCE DEVICE

CROSS REFERENCE TO RELATED APPLICATION

The present application is based on and claims priority of Japanese Patent Application No. 2020-208958 filed on Dec. 17, 2020.

FIELD

The present disclosure relates to vehicle guidance methods and vehicle guidance devices.

BACKGROUND

PTL 1 discloses a vehicle guidance method that can correct a deviation. Specifically, in the guidance method described above, a route from a starting position to a target position in a parking lot is identified outside a vehicle, information on at least a section in the route is transmitted to the vehicle through a communication network, and the vehicle is monitored for a deviation during autonomous travel of the vehicle following the section by using a monitoring system outside the vehicle. When a deviation occurs, a correction route for correcting the deviation is identified, the correction route is transmitted to the vehicle through the communication network, and thus the vehicle travels along the correction route. In this way, the deviation can be corrected in the guidance method.

CITATION LIST

Patent Literature

PTL 1: Japanese Unexamined Patent Application Publication (Translation of PCT Application) No. 2018-502357

SUMMARY

However, the guidance method according to PTL 1 can be improved upon.

In view of this, the present disclosure provides a vehicle guidance method and a vehicle guidance device capable of improving upon the above related art.

A vehicle guidance method according to one aspect of the present disclosure is a vehicle guidance method in a parking lot, and includes: determining, outside a vehicle, a travel route from a starting position to a target position in the parking lot; transmitting information on at least a section in the travel route to the vehicle through a communication network; and monitoring the vehicle for a deviation from the travel route during autonomous travel of the vehicle in the section, the vehicle being monitored using a monitoring system outside the vehicle. When the deviation is detected in the monitoring, a correction route for correcting the deviation is determined, and the correction route is transmitted to the vehicle through the communication network. When it is determined that the vehicle cannot travel along the correction route, an evacuation route with a current position of the vehicle set to the starting position and a predetermined location set to the target position is determined, and the evacuation route is transmitted to the vehicle through the communication network such that the vehicle travels along the evacuation route.

A vehicle guidance device according to one aspect of the present disclosure is a vehicle guidance device in a parking lot, and includes: a controller that determines, outside a vehicle, a travel route from a starting position to a target position in the parking lot, and transmits information on at least a section in the travel route to the vehicle through a communication network; and a monitor that monitors the vehicle for a deviation from the travel route during autonomous travel of the vehicle in the section, the vehicle being monitored using a monitoring system outside the vehicle. When the deviation is detected in the monitoring, the controller determines a correction route for correcting the deviation, and transmits the correction route to the vehicle through the communication network, and when the controller determines that the vehicle cannot travel along the correction route, the controller determines an evacuation route with a current position of the vehicle set to the starting position and a predetermined location set to the target position, and transmits the evacuation route to the vehicle through the communication network to cause the vehicle to travel along the evacuation route.

These comprehensive or specific aspects may be realized by a system, a method, an integrated circuit, a computer program, or a computer-readable recording medium such as a CD-ROM, or may be realized by any combination of the system, the method, the integrated circuit, the computer program, and the recording medium.

A vehicle guidance method according to one aspect of the present disclosure is capable of improving upon the above related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

DESCRIPTION OF EMBODIMENTS

Figure 1:
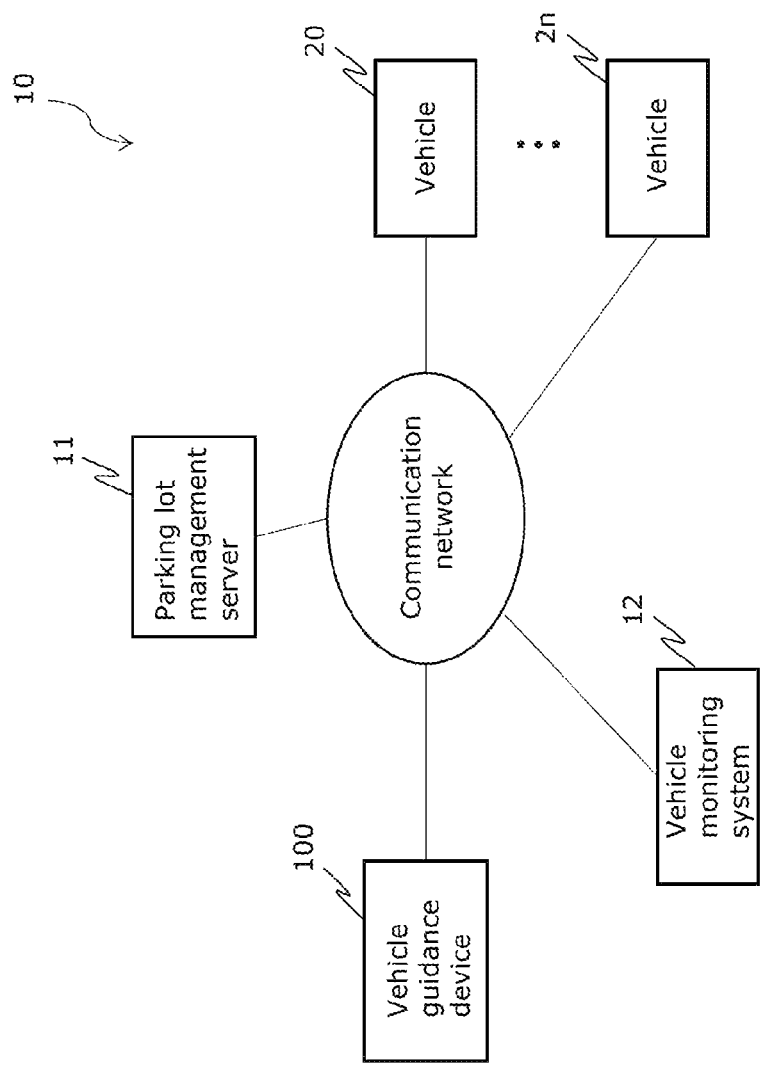
FIG. 1 is a block diagram showing an example of the configuration of a parking lot management system in an embodiment.

In an automated (autonomous) parking lot, which is the so-called valet parking, when a driver passes a vehicle at a delivery place, the vehicle autonomously travels from the delivery place to a parking position in an automated driving mode. Then, the vehicle autonomously returns again to a reception position in the automated driving mode. A parking lot management system provides, to the vehicle, a route from a starting position to a target position, and the vehicle travels along the provided route. However, it is likely that the vehicle cannot travel along the route to produce a deviation due to the uncertainty of a sensor around the vehicle, an algorithm, or an actuator.

As described above, in PTL 1, a deviation of the vehicle that travels along the route in automated driving is monitored, and when the vehicle deviates from the route, a correction route is provided. In this way, the vehicle can avoid the deviation.

However, depending on the cause of the deviation, even when the vehicle travels along the correction route, it is likely that the deviation cannot be corrected. Examples of such a case include a case where the air pressure of a tire of the vehicle is lowered, a case where a steering angle is low, and the like. In this case, since the operation of the vehicle assumed by the parking lot management system differs from the operation of the actual vehicle, the vehicle cannot travel along the correction route, with the result that a correction route is provided again. However, since the deviation results from a failure in the vehicle, the vehicle cannot correct the deviation, and thus this process may be repeated. It is likely that the vehicle stops at the same position to prevent the autonomous travel of the subsequent vehicle.

Hence, the present disclosure provides a vehicle guidance method and a vehicle guidance device that assist the travel of a vehicle which travels in an automated driving mode in a parking lot.

In the vehicle guidance method and the vehicle guidance device in the present disclosure, when the vehicle that autonomously travels in the automated driving mode in the parking lot deviates from a route, it is possible to assist the travel of the vehicle to smoothly operate parking lot.

A vehicle guidance method according to one aspect of the present disclosure is a vehicle guidance method in a parking lot, and includes: determining, outside a vehicle, a travel route from a starting position to a target position in the parking lot; transmitting information on at least a section in the travel route to the vehicle through a communication network; and monitoring the vehicle for a deviation from the travel route during autonomous travel of the vehicle in the section, the vehicle being monitored using a monitoring system outside the vehicle. When the deviation is detected in the monitoring, a correction route for correcting the deviation is determined, and the correction route is transmitted to the vehicle through the communication network. When it is determined that the vehicle cannot travel along the correction route, an evacuation route with a current position of the vehicle set to the starting position and a predetermined location set to the target position is determined, and the evacuation route is transmitted to the vehicle through the communication network such that the vehicle travels along the evacuation route.

In this way, when the vehicle cannot travel along the correction route, it is likely that the vehicle is evacuated to be able to avoid prevention of travel of the subsequent vehicle. Hence, it is likely that the parking lot can be smoothly operated.

A vehicle guidance device according to one aspect of the present disclosure is a vehicle guidance device in a parking lot, and includes: a controller that determines, outside a vehicle, a travel route from a starting position to a target position in the parking lot, and transmits information on at least a section in the travel route to the vehicle through a communication network; and a monitor that monitors the vehicle for a deviation from the travel route during autonomous travel of the vehicle in the section, the vehicle being monitored using a monitoring system outside the vehicle. When the deviation is detected in the monitoring, the controller determines a correction route for correcting the deviation, and transmits the correction route to the vehicle through the communication network, and when the controller determines that the vehicle cannot travel along the correction route, the controller determines an evacuation route with a current position of the vehicle set to the starting position and a predetermined location set to the target position, and transmits the evacuation route to the vehicle through the communication network to cause the vehicle to travel along the evacuation route.

In the vehicle guidance device described above, the same operation effects described above are achieved.

For example, the vehicle guidance method further includes: determining a magnitude of a deviation that occurs in the correction route, and when the magnitude of the deviation is greater than a predetermined magnitude, it is determined that the vehicle cannot travel along the correction route. In this way, it is likely that it can be determined that the deviation occurs due to a factor on the side of the vehicle. Hence, it is likely that repetition of travel of the vehicle along the correction route can be avoided.

For example, the vehicle guidance method further includes: measuring a total number of times a deviation occurs in the correction route, and when the total number of times the deviation occurs is equal to a predetermined number of times, it is determined that the vehicle cannot travel along the correction route. In this way, it is likely that repetition of travel of the vehicle along the correction route can be avoided. Hence, it is likely that prevention of travel of the subsequent vehicle can be avoided.

For example, the predetermined location is a parking space in which another vehicle is not parked in the section. For example, the predetermined location is an empty space in the section, the empty space being large enough to allow the vehicle to be parked. In this way, even when the vehicle is evacuated to another position, it is likely that prevention of the parking of another vehicle can be avoided. Hence, it is likely that the parking lot can be smoothly operated.

For example, the vehicle guidance method further includes: transmitting a stop command to the vehicle through the communication network when a deviation occurs in the evacuation route. In this way, when the vehicle cannot autonomously travel, it is likely that repetition of an evacuation operation can be prevented. Hence, it is likely that the parking lot can be smoothly operated.

For example, when factor information indicating a factor that prevents the vehicle from traveling along the correction route is received from the vehicle, the evacuation route is determined based on the factor information. In this way, it is likely that an avoidance route corresponding to the state of the vehicle can be determined. Hence, it is likely that the route along which the vehicle can autonomously travel can be provided.

For example, when it is determined from the factor information that the vehicle cannot autonomously travel, the vehicle is stopped. In this way, it is likely that repetition of travel of the vehicle along the correction route can be avoided. Hence, it is likely that prevention of travel of the subsequent vehicle can be avoided.

Embodiment

A vehicle guidance device according to an embodiment will be described below with reference to drawings.

1. Configuration

FIG. 1 is a block diagram showing an example of the configuration of a parking lot management system in the embodiment. Parking lot management system 10 includes at least vehicle guidance device 100 and parking lot management server 11. Parking lot management system 10 may include vehicle monitoring system 12 that monitors a vehicle. Parking lot management server 11, vehicle guidance device 100, and vehicle monitoring system 12 communicate with each other through a communication network. The communication network may include a mobile communication network (radio access network). The communication network may also include a wireless LAN (WLAN).

Parking lot management server 11 manages a parking lot that includes a plurality of parking spaces, the parking positions of one or more vehicles 20 to 2n (n is an integer greater than or equal to 1) that are passed to the parking lot, the operation of the vehicles within the parking lot, and the like. Vehicle guidance device 100 guides vehicles 20 to 2n and the travel operation of vehicles 20 to 2n.

Vehicles 20 to 2n are vehicles that can autonomously travel in an automated driving mode. Vehicles 20 to 2n have a communication function and are connected to parking lot management server 11 and vehicle guidance device 100 through the communication network. The automated driving mode means that the vehicle autonomously travels or travels by remote control, that is, indicates that the vehicle travels without intervention of a driver.

The present disclosure is targeted for a vehicle in the automated driving mode in a parking lot. Hence, the present disclosure is not targeted for a vehicle which is not in the automated driving mode, that is, is not targeted for a vehicle in a manual driving mode. The present disclosure is performed in an automated parking process. Here, the automated parking process includes autonomous travel from a delivery position to a parking position. The automated parking process also includes an autonomous operation of entering the parking position and an autonomous operation of exiting from the parking position. The automated parking process also includes autonomous travel from the parking position to a reception position.

The delivery position is a position in which the driver of the vehicle switches to the automated driving mode in the vehicle and in which the driver can stop the vehicle to get out of the vehicle. The delivery position is located, for example, around the entrance of the parking lot. The reception position is a position in which the driver of the vehicle can receive the vehicle after the automated parking process. The reception position is located, for example, around the exit of the parking lot. The delivery position and the reception position may be the same as each other or different from each other.

The parking lot is a region where vehicles are parked, and is an area that includes a plurality of parking spaces or parking sections. The parking lot may have a three-dimensional structure like a parking building. The parking lot may be an outdoor type or an indoor type.

Vehicle monitoring system 12 may have a configuration in which a plurality of camera are arranged within the parking lot and in which vehicle 20 and the travel operation of vehicle 20 are monitored by video captured with the cameras. Vehicle monitoring system 12 uses the captured video to monitor the state of travel of vehicle 20, the travel speed thereof, or the like. Vehicle monitoring system 12 may acquire the state of the vehicle, from a vehicle sensor system (not shown) for detecting the state of the vehicle, with various types of sensors installed in the vehicle by sensing. In other words, vehicle monitoring system 12 may be installed in vehicle 20.

Vehicle guidance device 100 provides a travel route in the parking lot to the vehicle and monitors whether or not the vehicle deviates from the travel route, and when the vehicle deviates from the travel route, vehicle guidance device 100 provides a correction route for correcting the deviation. When the vehicle cannot correct the deviation even with the correction route, vehicle guidance device 100 evacuates the vehicle.

Figure 2:
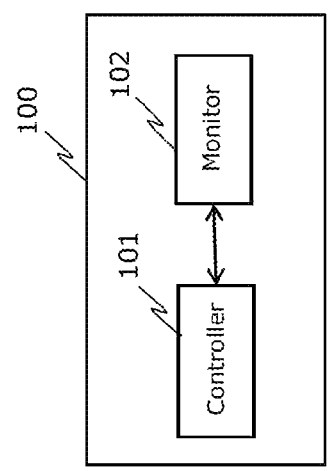
FIG. 2 is a block diagram showing an example of the configuration of a vehicle guidance device according to the embodiment.

FIG. 2 is a block diagram showing the configuration of vehicle guidance device 100 according to the embodiment. As shown in FIG. 2, vehicle guidance device 100 includes controller 101 and monitor 102. Controller 101 and monitor 102 indicate not substantial configurations but functions realized by vehicle guidance device 100. More specifically, a processor (such as a central processing unit (CPU)) (not shown) included in vehicle guidance device 100 executes predetermined programs with a memory (not shown) to be able to realize controller 101 and monitor 102.

A description will be given below using, as an example, a case where a target vehicle to be monitored is vehicle 20. In vehicle guidance device 100, a plurality of vehicles may be targets to be monitored at the same time.

Controller 101 calculates or determines the travel route from a starting position to a target position in the parking lot. Controller 101 transmits the determined route to vehicle 20 through the communication network. Controller 101 may divide the route into a plurality of sections and transmit information on at least a section to vehicle 20. Controller 101 sequentially transmits a route for each section, and vehicle 20 travels along the route which is sequentially received for each section. This is because vehicle 20 does not need to know the position thereof, the entire route, or the status of the parking lot. The route is divided into a plurality of sections, and thus the amount of data transmitted can be reduced, with the result that the vehicle can start to travel without receiving the entire route. The vehicle travels along the received travel route. When it is found from the result of the monitoring of monitor 102 that vehicle 20 deviates, controller 101 calculates or determines the correction route and transmits it to vehicle 20 through the communication network. When it is found from the result of the monitoring of monitor 102 that vehicle 20 deviates in the correction route, controller 101 calculates or determines an evacuation route and transmits it to vehicle 20 through the communication network.

Monitor 102 detects the deviation of vehicle 20. Monitor 102 acquires, from vehicle monitoring system 12, the state of travel of vehicle 20 which is present in the automated driving mode in the parking lot so as to detect the deviation of vehicle 20. Monitor 102 also acquires the state of vehicle 20 from the vehicle sensor system. Monitor 102 may include vehicle monitoring system 12.

2. Operation

Figure 3:
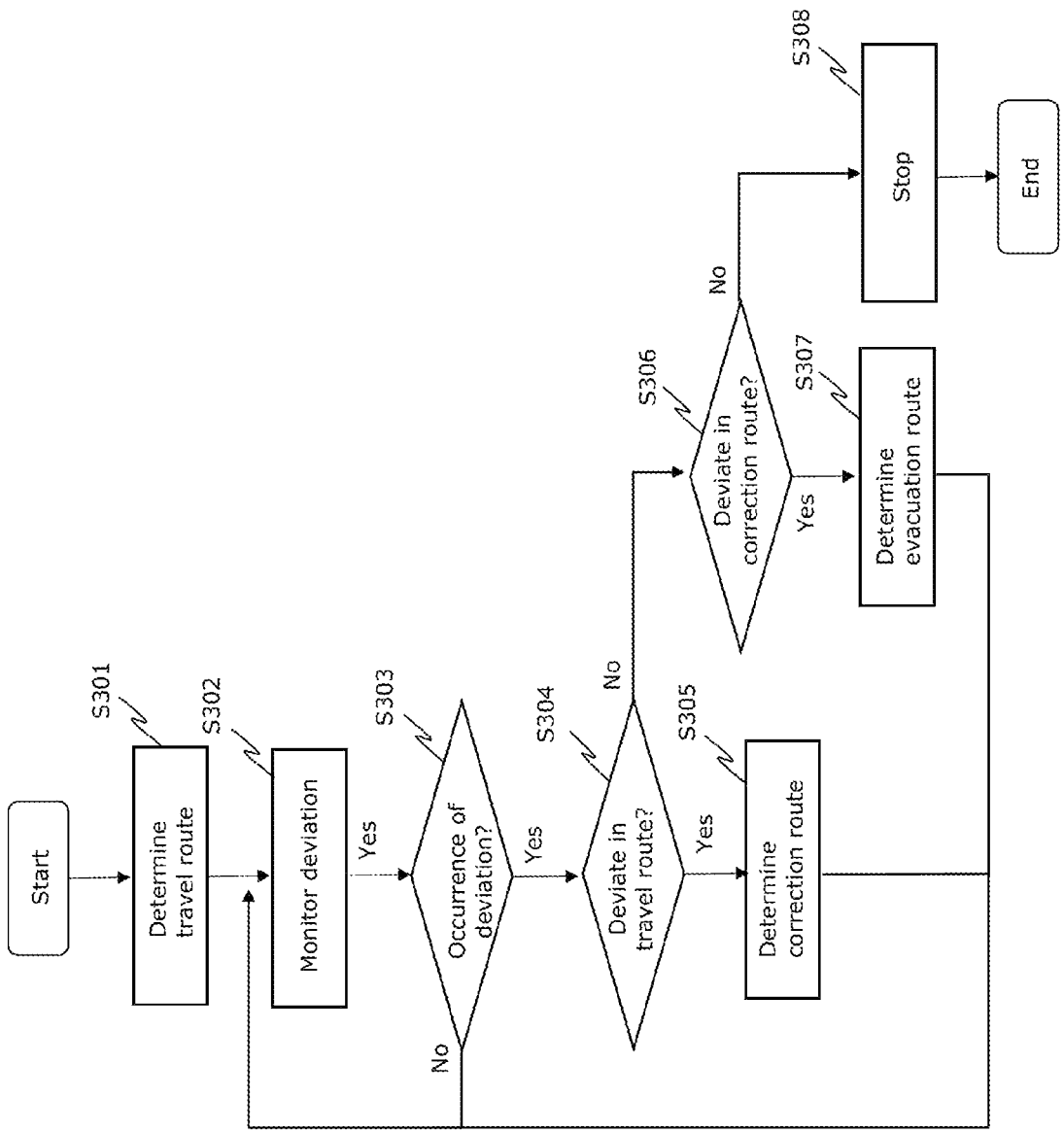
FIG. 3 is a flowchart showing the operation of the vehicle guidance device according to the embodiment.

FIG. 3 is a flowchart showing the operation of vehicle guidance device 100 according to the embodiment.

Controller 101 determines the travel route from the starting position to the target position in the parking lot. Controller 101 transmits information on at leas a section in the travel route to vehicle 20 through the communication network (step S301). Monitor 102 monitors, with vehicle monitoring system 12, the deviation of vehicle 20 which autonomously travels in the section described above (step S302). Monitor 102 determines whether or not vehicle 20 deviates. When monitor 102 determines that vehicle 20 deviates, monitor 102 notifies controller 101 that a deviation occurs in the route along which vehicle 20 travels. Here, monitor 102 may notify controller 101 of the magnitude of the deviation. Monitor 102 may acquire the magnitude of the deviation from vehicle monitoring system 12 or calculate the magnitude of the deviation with information acquired from vehicle monitoring system 12 (step S303). Monitor 102 repeats the operation of steps S302 and S303 until the autonomous travel of the vehicle is completed.

Controller 101 determines whether or not vehicle 20 deviates in the travel route (step S304). When controller 101 determines that vehicle 20 deviates in the travel route (yes in step S304), controller 101 determines the correction route for correcting the deviation and transmits information on at least a section in the correction route to vehicle 20 through the communication network (step S305). When controller 101 determines that vehicle 20 does not deviate in the travel route (no in step S304), controller 101 determines whether or not vehicle 20 deviates in the correction route (step S306). When controller 101 determines that vehicle 20 deviates in the correction route (yes in step S306), controller 101 changes the target position and determines the evacuation route to the changed target position in the parking lot. Controller 101 may determine the magnitude of the deviation which occurs in the correction route, and when the magnitude of the deviation is greater than a predetermined magnitude, controller 101 may determine that the vehicle cannot travel along the correction route. The total number of times the deviation occurs in the correction route may be measured, and when the total number of times the deviation occurs is equal to a predetermined number of times, controller 101 may determine that the vehicle cannot travel along the correction route. The predetermined number of times is, for example, three. Controller 101 transmits information on at least a section in the evacuation route to vehicle 20 through the communication network (step S307).

When controller 101 determines that vehicle 20 deviates in the evacuation route (no in step S306), controller 101 determines that it is difficult for vehicle 20 to autonomously travel, and transmits a stop signal to vehicle 20 to stop vehicle 20. When the deviation occurs the predetermined number of times in the evacuation route, controller 101 may determine that vehicle 20 is stopped (step S308). In this case, controller 101 may notify the manager of the parking lot that the vehicle is stopped partway through the evacuation route.

3. Operation Example

A specific operation will be described below with reference to drawings. Here, a description will be given using, as an example, the automated parking process in which vehicle 20 performs an entering operation.

Figure 4:
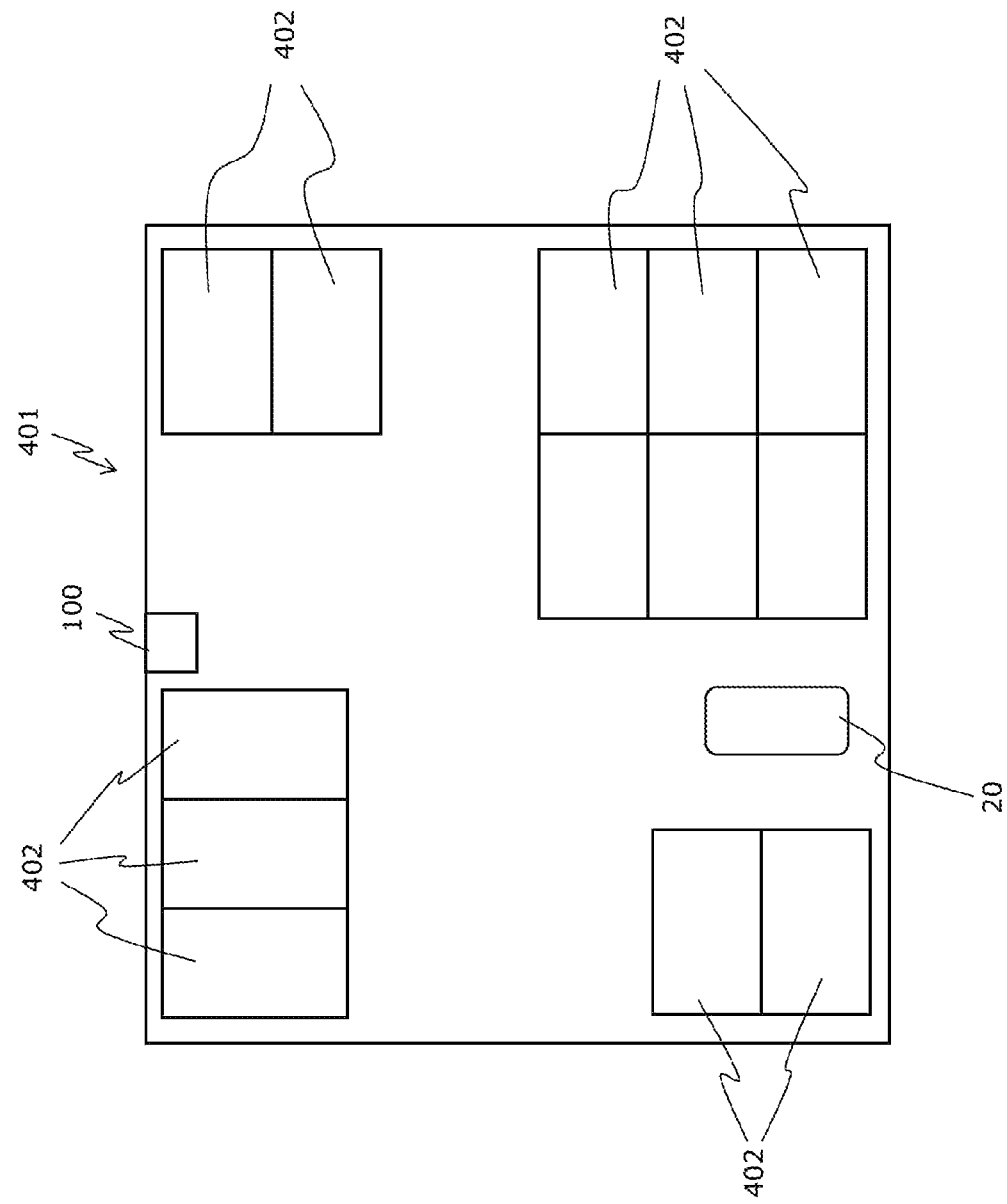
FIG. 4 is a diagram showing a parking lot system in the embodiment.
Figure 5:
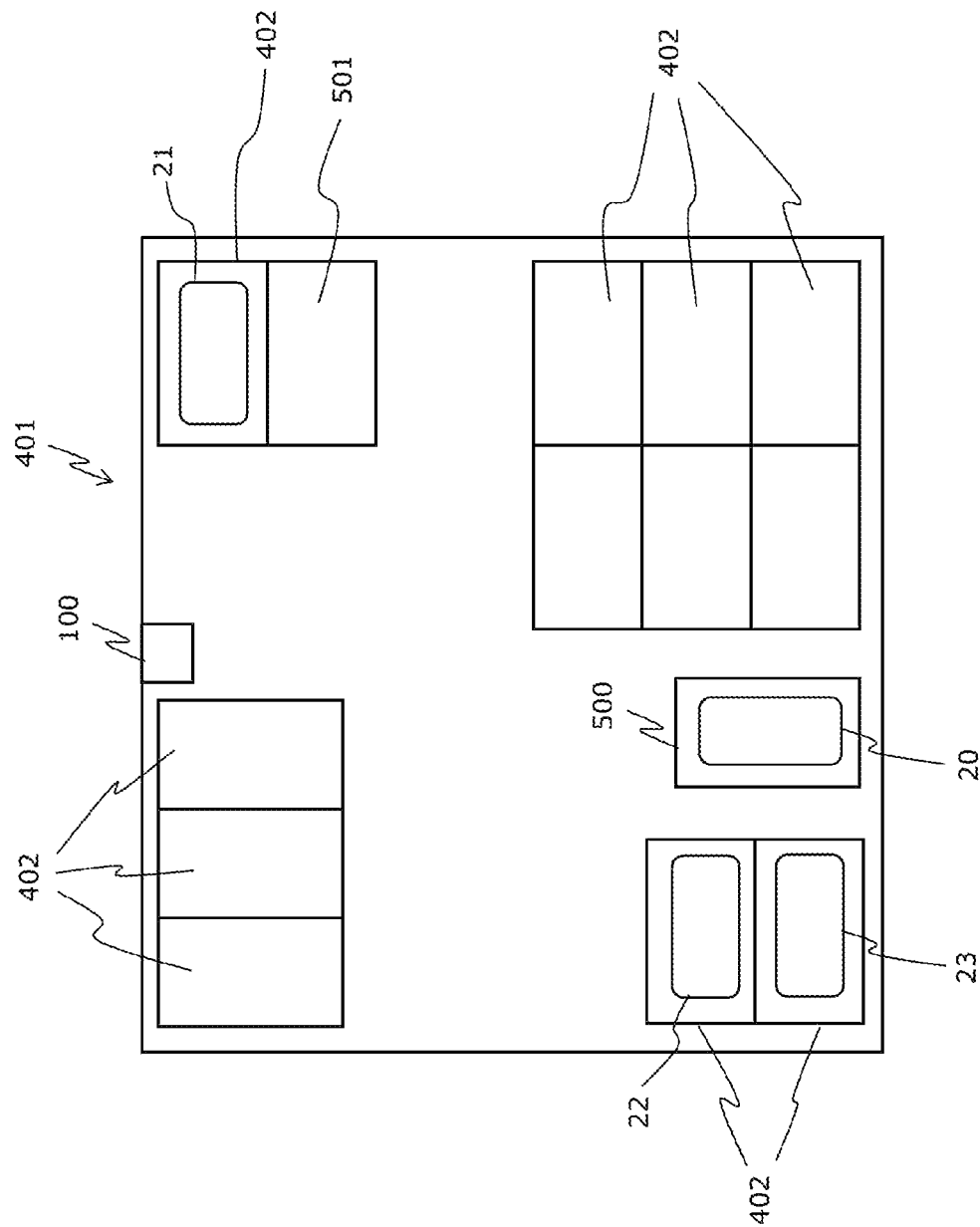
FIG. 5 is a diagram showing a starting position and a target position.

In FIG. 4, an example of the parking lot is shown. Parking lot 401 includes a plurality of parking spaces 402 corresponding to a parking area. In parking spaces 402, vehicle 20 can be parked. In parking lot 401, vehicle guidance device 100 is set. Vehicle monitoring system 12 may be included in vehicle guidance device 100. In vehicle monitoring system 12, one or a plurality of cameras or a video camera is included. In vehicle monitoring system 12, one or more radar sensors are included.

vehicle guidance device 100 and vehicle 20 communicate with each other through the communication network. Vehicle 20 autonomously travels according to a route received from vehicle guidance device 100. Here, a description will be given of a case where as shown in FIG. 5, vehicle 20 is guided to be parked in parking space 501. In parking lot 401, vehicles 21 to 23 are parked. In this case, current position 500 of vehicle 20 is assumed to be the starting position, and parking space 501 is assumed to be the target position. Controller 101 determines a travel route from the starting position to the target position.

Figure 6:
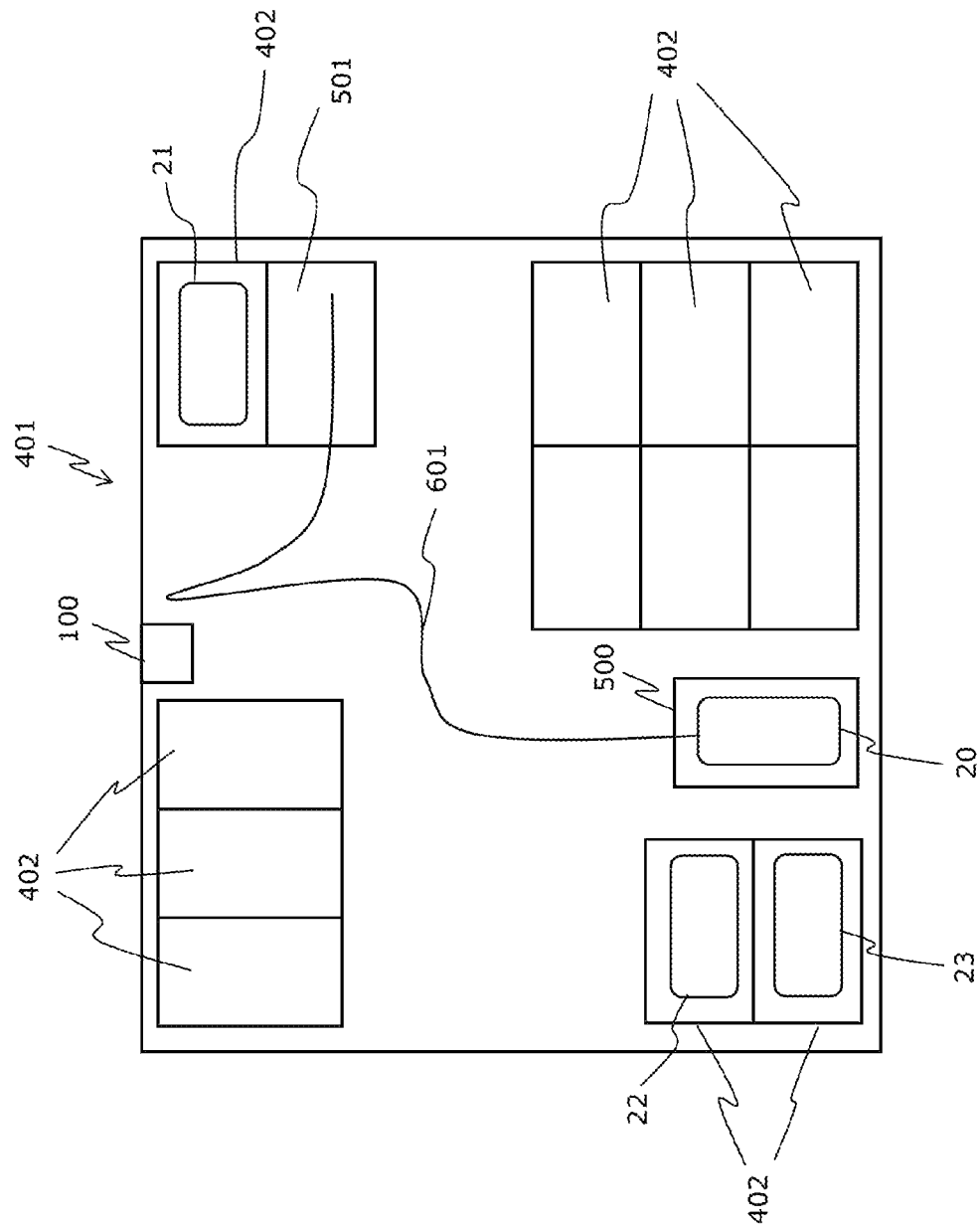
FIG. 6 is a diagram showing an example of a travel route.

The travel route is shown in FIG. 6. Controller 101 transmits information on at least part of sections in travel route 601 to vehicle 20 through the communication network. The vehicle autonomously travels along travel route 601 which is received. Monitor 102 monitors whether or not vehicle 20 deviates from travel route 601. When vehicle monitoring system 12 detects that vehicle 20 deviates from travel route 601, monitor 102 notifies controller 101 that vehicle 20 deviates. Controller 101 determines from the result of the monitoring of monitor 102 that vehicle 20 deviates from travel route 601, and determines a correction route.

Figure 7:
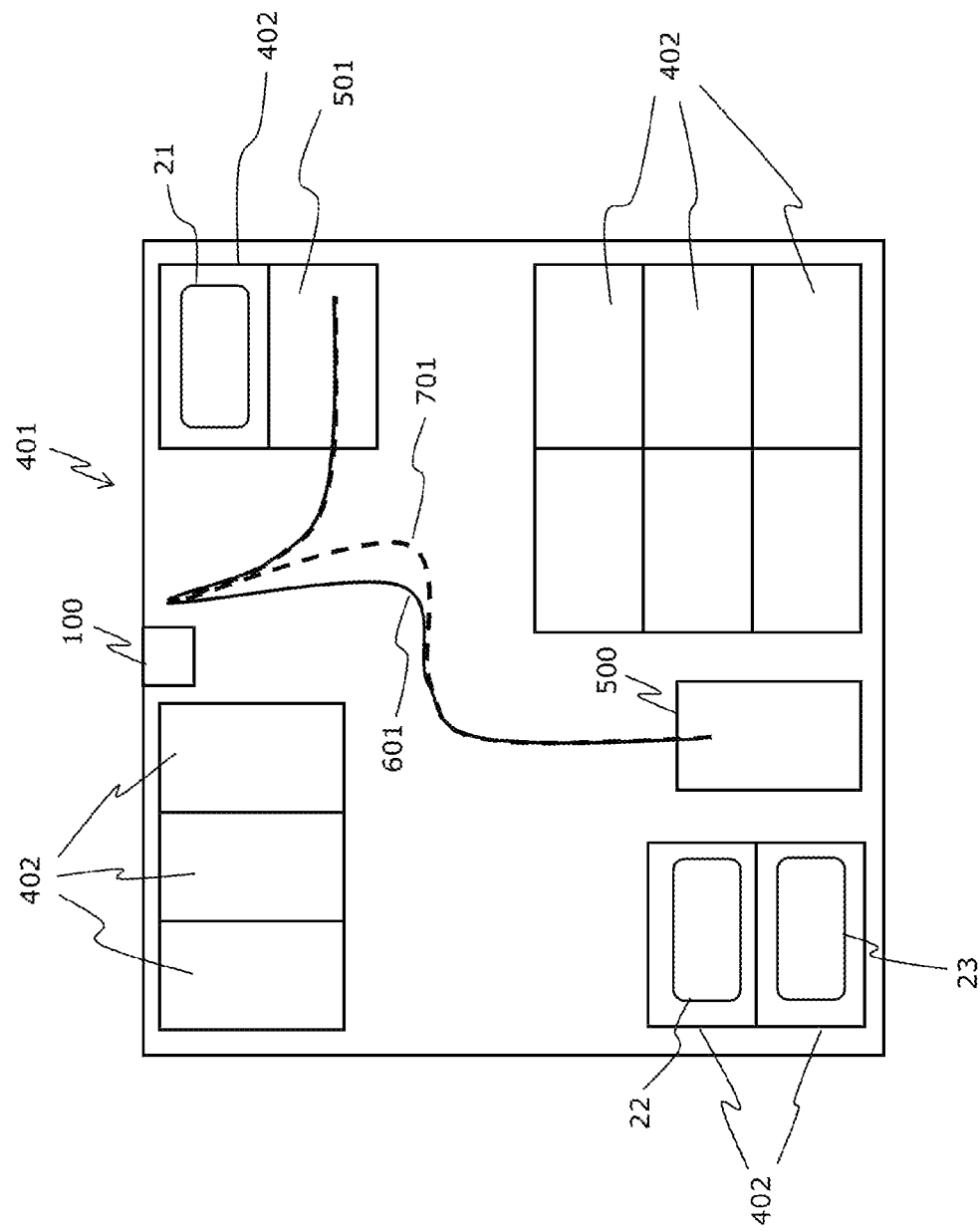
FIG. 7 is a diagram showing an example of a correction route.

The correction route is shown in FIG. 7. With consideration given to the state of travel of vehicle 21, controller 101 determines correction route 701. Controller 101 transmits information at least part of sections in correction route 701 to vehicle 21 through the communication network. The vehicle autonomously travels along correction route 701 which is received. Monitor 102 monitors whether or not vehicle 21 deviates from correction route 701. When vehicle monitoring system 12 detects that vehicle 20 deviates from correction route 701, monitor 102 notifies controller 101 that vehicle 20 deviates. When controller 101 determines that vehicle 20 cannot travel along correction route 701, controller 101 determines an evacuation route with the current position of vehicle 20 set to the starting position and a predetermined location set to the target position. Controller 101 determines the evacuation route in which the current position is set to the starting position and in which the target position is changed to the predetermined location.

When it is found from the result of the monitoring of monitor 102 that the magnitude of the deviation is greater than a predetermined magnitude, controller 101 determines that vehicle 20 cannot autonomously travel along correction route 701. When the deviation occurs a predetermined number of times, controller 101 may determine that vehicle 20 cannot autonomously travel along correction route 701. When the magnitude of the deviation is smaller than the predetermined magnitude or the total number of times the deviation occurs is not equal to the predetermined number of times, controller 101 calculates a correction route again and transmits it to vehicle 20. Vehicle 20 autonomously travels along the evacuation route which is received. Here, monitor 102 may acquire the magnitude of the deviation from vehicle monitoring system 12. Monitor 102 may calculate the magnitude of the deviation from information acquired from vehicle monitoring system 12.

Controller 101 may set the starting position and the target position to the current position. In other words, controller 101 may transmit a stop signal to vehicle 20 to stop the vehicle. Here, vehicle 20 is stopped, and thus it is possible to reduce the possibility of a collision with another vehicle, an object, or an obstacle around the vehicle. Controller 101 may temporarily stop vehicle 20 before vehicle 20 is caused to autonomously travel along the evacuation route.

Figure 8:
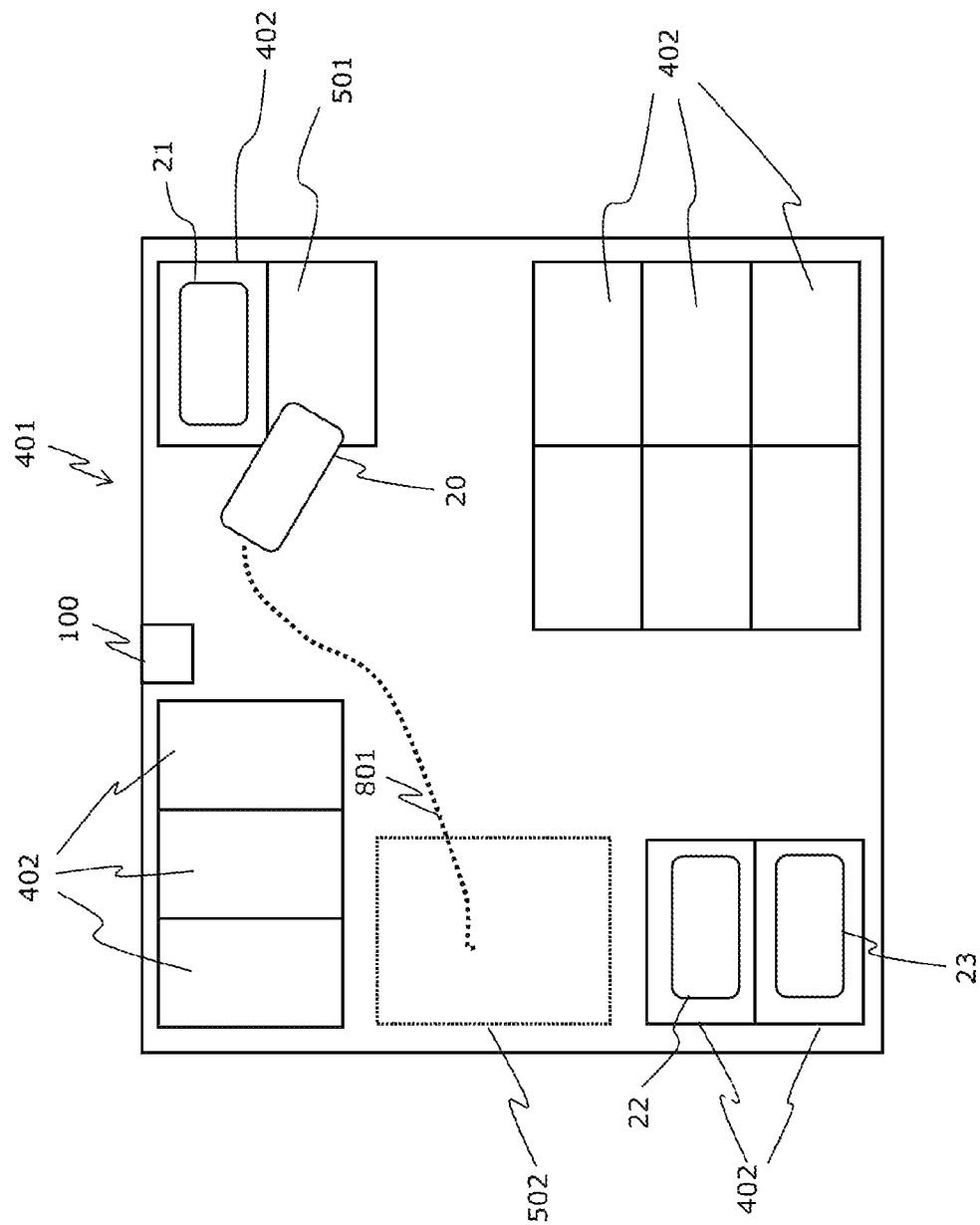
FIG. 8 is a diagram showing an example of an evacuation route.

In FIG. 8, an example of the evacuation route is shown. Controller 101 sets empty space 502 within parking lot 401 to the target position. Controller 101 determines evacuation route 801 with the current position of vehicle 21 set to the starting position and empty space 502 set to the target position. Vehicle 21 follows evacuation route 801 to be parked in empty space 502. Empty space 502 is larger than parking space 501, and is large enough to assume that even when vehicle 20 autonomously travels while deviating from evacuation route 801, vehicle 20 can be parked in empty space 502. When controller 101 determines evacuation route 801, controller 101 may preferentially select a passage that faces parking space 402 in which no vehicle is parked. In this way, it is likely that even when vehicle 20 enters part of parking space 402, it is possible to avoid a collision with the parked vehicle.

Figure 9:
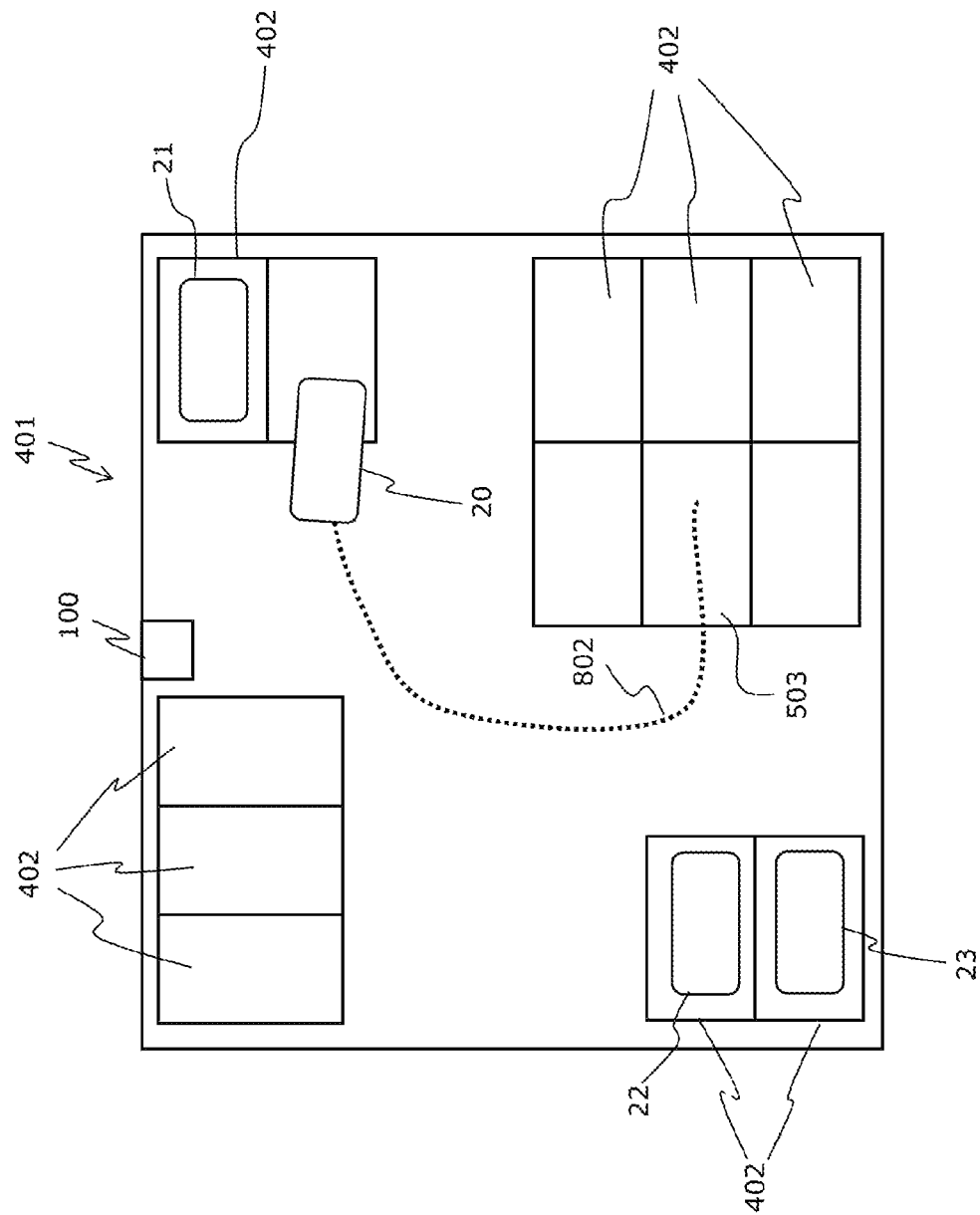
FIG. 9 is a diagram showing another example of the evacuation route.

In FIG. 9, another example of the evacuation route is shown. Controller 101 sets, to the target position, parking space 503 in which no vehicle is parked. Controller 101 determines evacuation route 802 with the current position of vehicle 21 set to the starting position and parking space 503 set to the target position. Vehicle 20 follows evacuation route 802 to be parked in parking space 503. Controller 101 may preferentially select, as parking space 503, a parking space in which no vehicle is parked and around which no vehicle is also parked in parking spaces 402. In this way, it is likely that even when vehicle 21 enters part of parking spaces 402 while deviating from evacuation route 802, it is possible to avoid a collision with another vehicle.

4. Effects and the Like

As described above, in the present embodiment, controller 101 determines the travel route from the starting position to the target position in the parking lot and transmits information on at least a section in the travel route to the vehicle through the communication network, and monitor 102 monitors, for a deviation from the travel route during autonomous travel of the vehicle in the section, the vehicle by using vehicle monitoring system 12 outside the vehicle. When a deviation occurs, controller 101 determines the correction route for correcting the deviation, and transmits the correction route to the vehicle through the communication network. When controller 101 determines that the vehicle cannot travel along the correction route, controller 101 determines the evacuation route with the current position of the vehicle set to the starting position and the predetermined location set to the target position, and transits the evacuation route to the vehicle through the communication network such that the vehicle travels along the evacuation route.

In this way, when the vehicle cannot travel along the correction route, it is likely that the vehicle is evacuated to be able to avoid prevention of travel of the subsequent vehicle. Hence, it is likely that the parking lot can be smoothly operated.

Controller 101 determines the magnitude of the deviation that occurs in the correction route, and, when the magnitude of the deviation is greater than the predetermined magnitude, controller 101 determines that the vehicle cannot travel along the correction route. In this way, it is likely that it can be determined that the deviation occurs due to a factor on the side of the vehicle. Hence, it is likely that repetition of travel of the vehicle along the correction route can be avoided.

The vehicle repeats the deviation in the correction route, and when the total number of times the deviation occurs is equal to the predetermined number of times, controller 101 determines that the vehicle cannot travel along the correction route. In this way, it is likely that repetition of travel of the vehicle along the correction route can be avoided. Hence, it is likely that prevention of travel of the subsequent vehicle can be avoided.

The predetermined location is a parking space in which no vehicle is parked in the section. The predetermined location is an empty space within the parking lot, and the empty space is large enough to allow the vehicle to be parked in the section. In this way, even when the vehicle is evacuated to the parking space, it is likely that prevention of the parking of another vehicle can be avoided. Hence, it is likely that the parking lot can be smoothly operated.

When a deviation occurs in the evacuation route, controller 101 transmits a stop command to the vehicle through the communication network. In this way, when vehicle 20 cannot autonomously travel, it is likely that repetition of an evacuation operation can be prevented. Hence, it is likely that the parking lot can be smoothly operated.

When controller 101 receives, from the vehicle, information of an inhibition factor that prevents the vehicle from traveling along the correction route, controller 101 determines the evacuation route based on the information of the inhibition factor. In this way, it is likely that an avoidance route corresponding to the state of the vehicle can be determined. Hence, it is likely that the route along which the vehicle can autonomously travel can be provided.

When controller 101 determines from the information of the factor that the vehicle cannot autonomously travel, controller 101 stops the vehicle. In this way, it is likely that repetition of travel of the vehicle along the correction route can be avoided. Hence, it is likely that prevention of travel of the subsequent vehicle can be avoided.

Although in the description of the present embodiment, the autonomous entering operation of vehicle 20 is used as an example, the present embodiment is not limited to this example, and when vehicle 20 deviates during the autonomous exiting operation or the autonomous travel, it is likely that the same operation is performed to be able to reduce a collision with another vehicle or the like. In this way, it is likely that the parking lot can be smoothly operated.

Other Embodiments

The embodiment has been described above as an example of techniques disclosed in the present application. However, the techniques in the present disclosure are not limited to this embodiment, and can also be applied to embodiments obtained by performing modification, replacement, addition, omission, and the like as necessary. Constituent elements described in the above embodiment and other embodiments below can be combined to form new embodiments.

Hence, the other embodiments will be illustrated below.

Although in the embodiment, monitor 102 detects the deviation of the vehicle, when the vehicle makes an emergency stop due to an obstacle appearing ahead of the vehicle and then travels again, it is likely that the vehicle cannot travel along the received travel route. Since the vehicle does not deviate from the travel route, monitor 102 does not provide a notification to controller 101. In this case, the vehicle may request the vehicle guidance device to transmit a route with the current position set to the starting position. Controller 101 receives the route request from the vehicle, determines the route from the current position to the target position, and transmits it to the vehicle. The new route may be the same as the original travel route.

Monitor 102 may acquire information indicating the status of the vehicle from vehicle monitoring system 12. For example, monitor 102 acquires the information of a direction (such as a forward direction, a backward direction, or a lateral direction) of a sensor that detects an obstacle, camera video information that is captured, the pressure information of a bumper or the like, and the like. Controller 101 may use these types of information to determine a new route. Depending on the status of the vehicle, controller 101 may leave the vehicle stopped. In this case, information indicating that the vehicle is stopped partway through the route may be notified to the manager of the parking lot. In this way, it is likely that the manager can take measures to move the vehicle which is stopped.

As the target position when the evacuation route is determined, the delivery position may be set.

Although the form of the vehicle guidance device has been described above according to the embodiments, the form of the vehicle guidance device is not limited to the embodiments. Variations that are conceived by a person skilled in the art may be performed on the embodiments, and a plurality of constituent elements in the embodiments may be arbitrarily combined together.

For example, processing that is performed with a specific constituent element in the embodiments may be performed with another constituent element instead of the specific constituent element. The order of a plurality of types of processing may be changed or a plurality of types of processing may be performed at the same time.

A vehicle monitoring method that includes steps performed with the constituent elements of the vehicle guidance device may be performed with an arbitrary device or system. For example, part or all of the vehicle guidance method may be executed with a computer (for example, an information processing circuit) that includes a processor, a memory, an input/output circuit, and the like. Here, programs for instructing the computer to execute the vehicle guidance method may be executed by the computer to execute the vehicle guidance method.

In a non-transitory computer-readable recording medium, the programs described above may be recorded.

The constituent elements of the vehicle guidance device may be formed by dedicated hardware, may be formed by general-purpose hardware for executing the programs described above and the like or may be formed by combining them together. The general-purpose hardware may be formed with a memory in which programs are recorded, a general-purpose processor which reads a program from the memory to execute the program and the like. Here, the memory may be a semiconductor memory, a hard disk or the like, and the general-purpose processor may be a CPU or the like.

The dedicated hardware may be formed with a memory, a dedicated processor and the like. For example, the dedicated processor may reference a memory for recording data to execute the vehicle guidance device described above.

The constituent elements of the vehicle guidance device may be electrical circuits. These electrical circuits may form one electrical circuit as a whole or may be separate electrical circuits. These electrical circuits may correspond to dedicated hardware or may correspond to general-purpose hardware that executes the programs described above and the like.

While various embodiments have been described herein above, it is to be appreciated that various changes in form and detail may be made without departing from the spirit and scope of the present disclosure as presently or hereafter claimed.

Further Information about Technical Background to this Application

The disclosures of the following patent applications including specification, drawings and claims are incorporated herein by reference in their entirety: Japanese Patent Application No. 2020-208958 filed on Dec. 17, 2020.

INDUSTRIAL APPLICABILITY

The present disclosure can be utilized for a vehicle guidance method that guides a vehicle which travels in an automated driving mode in a parking lot.

The invention claimed is:

1. A vehicle guidance method in a parking lot, the vehicle guidance method comprising:
   determining, outside a vehicle, a travel route from a starting position to a target position in the parking lot;
   transmitting information on at least a section in the travel route to the vehicle through a communication network;
   monitoring the vehicle for a deviation from the travel route during autonomous travel of the vehicle in the section, the vehicle being monitored using a monitoring system outside the vehicle;
   determining, when the deviation is detected in the monitoring, a correction route for correcting the deviation;
   transmitting the correction route to the vehicle through the communication network;
   determining, when the vehicle cannot travel along the correction route, an evacuation route with a current position of the vehicle set to the starting position and a predetermined location set to a second target position; and
   transmitting the evacuation route to the vehicle through the communication network such that the vehicle travels along the evacuation route,
   wherein the evacuation route includes the second target position being different than the target position of the travel route.

2. The vehicle guidance method according to claim 1, further comprising:
   determining a magnitude of a deviation that occurs in the correction route,
   wherein when the magnitude of the deviation is greater than a predetermined magnitude, the method determines that the vehicle cannot travel along the correction route.

3. The vehicle guidance method according to claim 1, further comprising:
   measuring a total number of times a deviation occurs in the correction route,
   wherein when the total number of times the deviation occurs is equal to a predetermined number of times, the method determines that the vehicle cannot travel along the correction route.

4. The vehicle guidance method according to claim 1, wherein the predetermined location is a parking space in which another vehicle is not parked in the section.

5. The vehicle guidance method according to claim 1, wherein the predetermined location is an empty space in the section, the empty space being large enough to allow the vehicle to be parked.

6. The vehicle guidance method according to claim 1, further comprising:
   transmitting a stop command to the vehicle through the communication network when a deviation occurs in the evacuation route.

7. The vehicle guidance method according to claim 1, wherein when factor information indicating a factor that prevents the vehicle from traveling along the correction route is received from the vehicle, the evacuation route is determined based on the factor information.

8. The vehicle guidance method according to claim 7, wherein when the method determines from the factor information that the vehicle cannot autonomously travel, the vehicle is stopped.

9. A vehicle guidance device in a parking lot, the vehicle guidance device comprising:
- a controller that determines, outside a vehicle, a travel route from a starting position to a target position in the parking lot, and transmits information on at least a section in the travel route to the vehicle through a communication network; and
- a monitor that monitors the vehicle for a deviation from the travel route during autonomous travel of the vehicle in the section, the vehicle being monitored using a monitoring system outside the vehicle,
- wherein when the deviation is detected by the monitor, the controller determines a correction route for correcting the deviation, and transmits the correction route to the vehicle through the communication network,
- when the controller determines that the vehicle cannot travel along the correction route, the controller determines an evacuation route with a current position of the vehicle set to the starting position and a predetermined location set to a second target position, and transmits the evacuation route to the vehicle through the communication network to cause the vehicle to travel along the evacuation route, and
- the evacuation route includes the second target position being different than the target position of the travel route.

* * * * *